Figure 1:
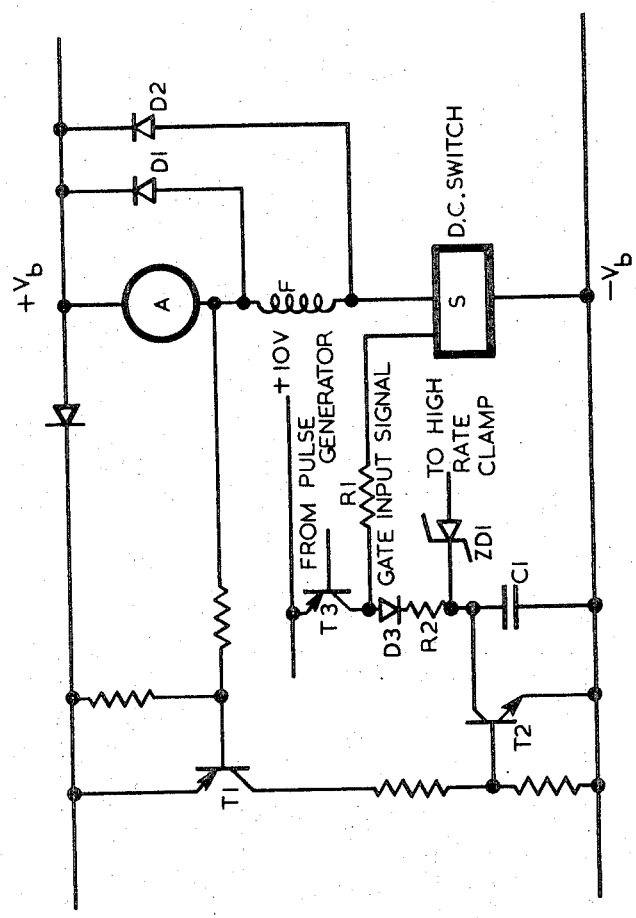

United States Patent [19]
Morton et al.

[11] 3,811,080
[45] May 14, 1974

[54] CONTROL CIRCUITS FOR D.C. ELECTRIC MOTORS

[75] Inventors: John Morton, Hazel Grove; Keith Drummond Stevens, Marple; Graham Spencer Thexton, Marple Bridge, all of England

[73] Assignee: Cableform Limited, Cheshire, England

[22] Filed: Apr. 24, 1972

[21] Appl. No.: 246,547

[30] Foreign Application Priority Data
May 11, 1971 Great Britain............... 14340/71

[52] U.S. Cl. ........................... 318/341, 318/380
[51] Int. Cl. ........................................... H02p 3/12
[58] Field of Search............ 318/341, 367, 379–381

[56] References Cited
UNITED STATES PATENTS
3,297,931  1/1967  Gurwicz............................ 318/380
3,651,390  3/1972  Vidal et al. ..................... 318/379 X
3,697,845  10/1972  Soffer et al. ................... 318/380 X Primary Examiner—Bernard A. Gilheany
Assistant Examiner—W. E. Duncanson, Jr.
Attorney, Agent, or Firm—Holman & Stern

[57] ABSTRACT

In control circuits for controlling D.C. electric motors, the motor is supplied in pulses so that the mean power supplied to the motor is varied by varying the frequency and/or mark-space ratio of the generator pulses. In such arrangements electrical braking is obtained by reversing the field winding connections but the field current has to be kept relatively low even for heavy braking. In the present invention means are provided for ascertaining if the armature current exceeds the field current during each pulse of current and for restricting the range of current which can be applied to the motor if the armature current exceeds the field current by a predetermined amount.

5 Claims, 2 Drawing Figures

CONTROL CIRCUITS FOR D.C. ELECTRIC MOTORS

This invention relates to control circuits for controlling D.C. electric motors, for example, a battery operated motor as is used in battery operated vehicles.

In such control circuits current from the D.C. source, e.g., battery, to the motor is supplied in pulses controlled by a thyristor arrangement, the conduction of which is controlled by a pulse generator so that the mean power supplied to the motor is varied by varying the frequency and/or mark-space ratio of the generator pulses.

In such arrangements electrical braking is obtained by throwing a reversing switch which reverses the field winding connections. However, due to the high e.m.f. generated and the consequential currents, the field current has to be kept relatively low even for heavy braking.

An object of the present invention is to provide a control circuit which inhibits the application of high field currents to the motor after the reversing switch has been thrown and before the motor has substantially come to rest.

According to the invention a control circuit for controlling a D.C. electric motor having an armature and a field and a diode connected across the armature so as to be in reverse bias polarity when the motor is in drive condition, comprises a D.C. switch which provides pulses of current to the motor, means for ascertaining if the armature current exceeds the field current during each pulse of current and means for restricting the range of current which can be applied to the motor if the armature current exceeds the field current by a predetermined amount.

Preferably in accordance with the invention, there is provided a control circuit for controlling a D.C. electric motor having an armature and a field and a diode connected across the armature so as to be in reverse bias polarity when the motor is in drive condition, comprising a D.C. switch which provides pulses of current from a D.C. source to the motor, which pulses vary in frequency and/or mark-space ratio in accordance with a control signal, a capacitor which commences charging at the beginning of each current pulse and is discharged by switching means which is conductive when the diode across the armature is reverse biassed, and means for ascertaining, during each pulse, if the charge on the capacitor reaches a predetermined level, the arrangement being such that a full range of current may be applied to the motor if the predetermined level is not reached and only a restricted range of current may be applied if the predetermined level is reached.

With this arrangement of the armature diode, the current in the armature is always equal to or greater than that in the field, when the D.C. switch is turned on.

If the armature is stationary, or providing a back emf to the battery voltage, the diode is reverse biased and armature and field currents are equal. If the armature is generating, the diode will carry a generated current over and above that in the field, and will be forward biased. It is also known that the diode can be forward biased during the inter-pulse period, if the armature time constant is longer than that of the field.

The arrangement in accordance with the invention differentiates between the motoring and generating conditions, without being confused by the forward biasing during the inter-pulse period.

In the motoring condition, any current still in the armature diode at the end of the inter-pulse period is very low. When the D.C. switch is turned on, the field current rises and, within a very short time, reaches the level of the armature current; at this point the armature diode voltage reverses.

In the generating condition, the armature diode current is maintained throughout the inter-pulse period at a high level, whilst the field current falls as before. When the D.C. switch is turned on the field current takes much longer to reach the level of the armature current, and in conditions of heavy braking will never reach it at all.

It is possible, therefore, to distinguish clearly between the motoring and generating conditions by measuring the time lag, $\phi$, between the switch-on of the D.C. switch, and the reversal of the armature diode.

Figure 2:
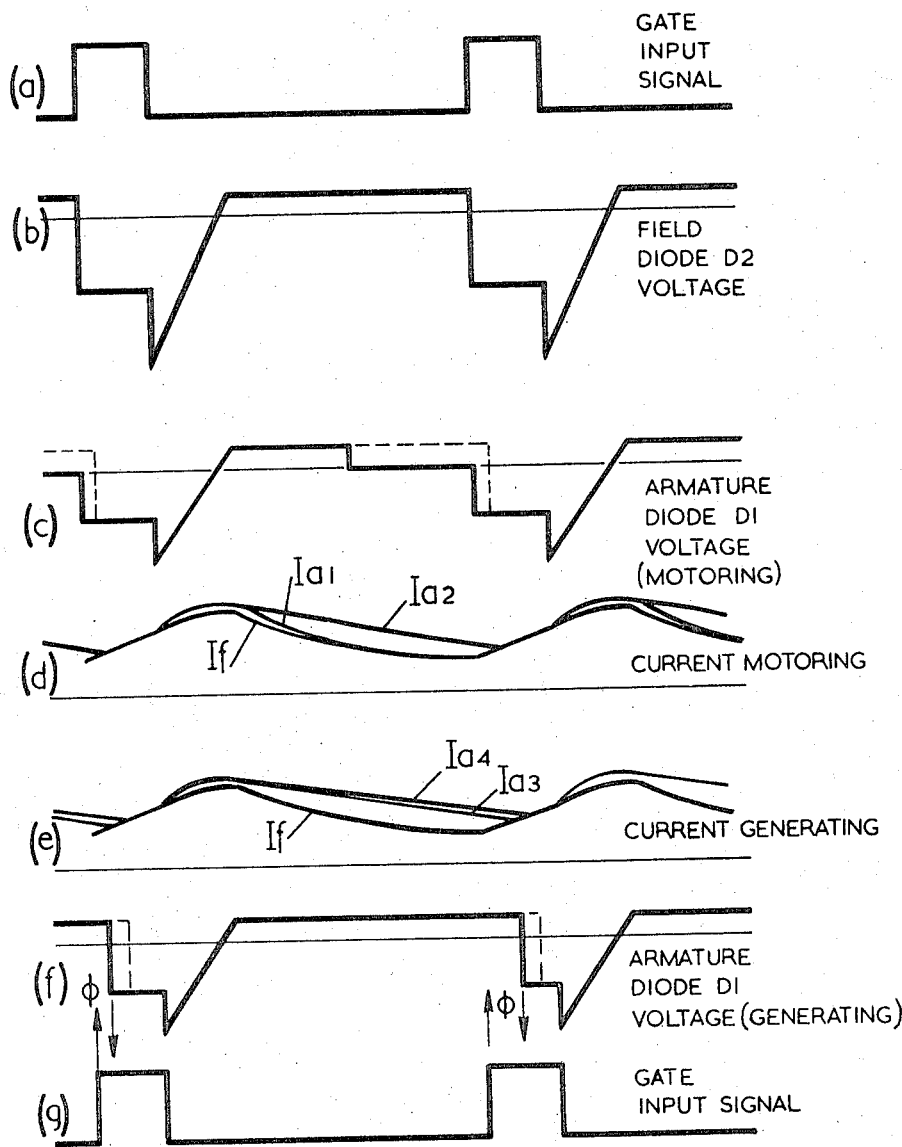

An embodiment of the invention will now be described by way of example, with reference to the accompanying drawing, in which:

FIG. 1 is a schematic circuit diagram of a control circuit in accordance with the invention, and FIG. 2 shows waveforms of voltage and current in various parts of FIG. 1.

The circuit comprises the series arrangement of a D.C. switch S and the field F and armature A of an electric drive motor across a battery as represented by the voltage rails $+Vb$ and $-Vb$. A diode D1 is connected across the armature A so as to be in reverse bias during normal motoring conditions. Also a diode D2 is connected across the field F and armature A. The D.C. switch S provides pulses of current which vary in frequency and/or mark-space ratio to vary the mean current supplied to the motor. Such a D.C. switch usually comprises a thyristor arrangement with usual commutating means. The conduction of the thyristors is controlled by a gate input signal in the form of pulses from a pulse generator (not shown), the pulses being applied to the base of the transistors T3, the collector of which is connected via a resistor R1 to the switch S and via a diode D3 and charging resistor R2 to a capacitor C1.

At the beginning of each gate pulse, capacitor C1 begins to charge and switch S supplies current to the motor. If there is any current in the armature the field current rises until it reaches the armature current whereupon diode D1 becomes reverse biassed and transistor T1, those base-emitter circuit is connected across the armature, becomes conductive causing transistor T2 to conduct and capacitor C1 to be discharged.

As already mentioned, in the motoring condition, the field current rises in a very short time to reach the armature current and therefore very little charge is acquired on capacitor C1. However in the generating condition, i.e. when braking is required, the armature current is very high and the field current takes much longer to reach or try to reach the level of the armature current, so that capacitor C1 continues to charge until the striking voltage of a Zenner diode ZD1 is reached. When this happens, diode ZD1 conducts and a signal is passed to a high rate clamp in the pulse generator (not shown) causing it to restrict the range of current which may be applied to the motor, for example by restricting the maximum frequency of pulses of current which can be applied to the motor during conditions which are identified as braking.

FIG. 2 shows the waveforms at various parts of the circuit arrangement. Waveforms (a) and (g) show the gate input signal applied to thyristors in the D.C. switch. The waveform corresponds to the signal supplied to the base of transistor T3 from the pulse generator. This same signal is applied to the charging circuit formed of diode D3, resistor R2 and capacitor C1.

Waveform (b) is the voltage appearing across diode D2, i.e., across the series combination of field F and armature A.

Waveform (c) is the voltage across armature diode D1, in the motoring condition, the full line showing the voltage when the armature current Ia follows the curve Ia1 in wavefrom (d) and the broken line shows the difference when the armature current follows the curve Ia2.

Waveform (d) shows the current curves for field current If and the two previously mentioned values of Ia1 and Ia2 of armature current, in the motoring condition.

Waveform (e) shows the current curves for field current If and two values of armature current Ia3 and Ia4, in the generating (i.e., braking) condition.

Waveform (f) shows the voltage across armature diode D1, in the generating condition, the broken line showing the difference when the armature current follows Ia4, the full line being for armature current Ia3. The time lag $\phi$ between the beginning of the gate pulse and the reversal of the voltage across the diode is readily seen.

By adjusting the allowable time lag, i.e., by adjustment of the value of resistor R2 and/or capacitor C1 it is possible to give a threshold speed for electric braking, for starting and reversing on gradients.

The advantages of the arrangement in accordance with the invention are:

a. That the controller can start at a high repetition rate and be set back to a low rate for braking. This avoids any delay in normal starting incurred with a system which always starts in a braking rate.

b. It is not confused by free-wheeling currents in the armature diode during the inter-pulse period. This is a problem with systems which either make instantaneous or average measurements of positive armature diode voltage.

c. Checking of the relationship between the armature current and the field current takes place at every current pulse applied to the motor and the built-in delays which are necessary in average measurement arrangements are therefore not required.

What is claimed is:

1. A control circuit for controlling a D.C. electric motor having an armature and a field and a diode connected across the armature so as to be in reverse bias polarity when the motor is in drive condition, comprising a D.C. switch which provides pulses of current from a D.C. source to the motor, which pulses vary in frequency and/or mark-space ratio in accordance with a control signal, a capacitor which commences charging at the beginning of each current pulse and is discharged by switching means which is conductive when the diode across the armature is reverse biassed, and means for ascertaining, during each pulse, if the charge on the capacitor reaches a predetermined level, the arrangement being such that a full range of current may be applied to the motor if the predetermined level is not reached and only a restricted range of current may be applied if the predetermined level is reached.

2. A control circuit as claimed in claim 1, wherein the discharge switching means comprises a transistor connected across said capacitor, the base emitter circuit of the transistor being included in the output circuit of a second transistor whose base emitter circuit is connected across the armature diode.

3. A control circuit as claimed in claim 1, wherein said capacitor is in series with a charging resistor in the output circuit of a transistor to the base of which the pulse control signal is applied.

4. A control circuit as claimed in claim 1, wherein the means for ascertaining if the charge on the capacitor reaches a predetermined level comprises a Zenner diode which becomes conductive when the voltage across the capacitor reaches the threshold breakdown voltage of the Zenner diode.

5. A control circuit as claimed in claim 4, wherein, whilst the Zenner diode is conductive, a clamp in a pulse generator which produces the control signal, is operative to restrict the frequency range of the pulses in the control signal.

* * * * *